United States Patent
Naito

(10) Patent No.: US 7,298,731 B2
(45) Date of Patent: Nov. 20, 2007

(54) MOBILE COMMUNICATION SYSTEM, RADIO BASE STATION APPARATUS, AND METHOD FOR DETERMINING UPLINK RECEPTION SYNCHRONIZATION

(75) Inventor: Takahiro Naito, Saitama (JP)

(73) Assignee: NEC Corporation, Tokyo (JP)

( * ) Notice: Subject to any disclaimer, the term of this patent is extended or adjusted under 35 U.S.C. 154(b) by 744 days.

(21) Appl. No.: 10/721,886

(22) Filed: Nov. 26, 2003

(65) Prior Publication Data

US 2004/0109422 A1 Jun. 10, 2004

(30) Foreign Application Priority Data

Dec. 4, 2002 (JP) ............................. 2002-351906

(51) Int. Cl.
*H04J 3/06* (2006.01)
(52) U.S. Cl. ...................................... 370/350; 370/328
(58) Field of Classification Search ................ 370/320, 370/328, 333, 350
See application file for complete search history.

(56) References Cited

U.S. PATENT DOCUMENTS

| 7,159,155 B2 * | 1/2007 | Obuchi et al. | 714/704 |
|---|---|---|---|
| 2002/0016179 A1 * | 2/2002 | Baker et al. | 455/522 |
| 2002/0191578 A1 * | 12/2002 | Bachl et al. | 370/342 |
| 2005/0157759 A1 * | 7/2005 | Ohno et al. | 370/535 |

FOREIGN PATENT DOCUMENTS

JP 2004-644191 A 2/2004

OTHER PUBLICATIONS

3GPP TS 25.133 V5.4.0, 3rd Generation Partnership Project; Technical Specification Group Radio Access Network; Requirements for Support of Radio Resource Management (FDD), Sep. 2002, pp. 35-55.

K. Tachikawa, "W-CDMA Mobile Communication System, section 3, Wireless System, 3-3, Wireless Access Interface Standards, m. Compressed Mode", Mar. 15, 2002. pp. 140.

3GPP TS 25.215 V5.1.0, 3rd Generation Partnership Project; Technical Specification Group Radio Access Network; Physical layer - Measurements (FDD), Sep. 2002, pp. 14-16.

3GPP TS 25.212 V5.2.0, 3rd Generation Partnership Project; Technical Specification Group Radio Access Network; Mutiplexing and channel coding (FDD), Sep. 2002, pp. 49-50.

\* cited by examiner

*Primary Examiner*—Duc M. Nguyen
*Assistant Examiner*—Eric J Elcenko
(74) *Attorney, Agent, or Firm*—Sughrue Mion Pllc.

(57) ABSTRACT

A radio base station apparatus capable of improving accuracy of synchronization detection and making stable determination of reception synchronization without erroneous synchronization determination is provided.

A TFCI bit error determination section re-encodes a decoded TFCI value, and computes the difference between the re-encoded TFCI symbol and a hard-decided symbol of the received TFCI symbol. A TFCI decoding characteristic determination section computes a characteristic indicator value from a correlation result of Fast Hadamard Transform used in a soft decision TFCI decoder. An uplink radio synchronization state determination section determines state transitions of the uplink synchronization state by using synchronization state determination parameters, a reception SIR value computed by a reception SIR determination section, the number of pilot error bits computed by a pilot bit error determination section, the number of error TFCI bits computed by the TFCI bit error determination section, and the TFCI decoding characteristic indicator value computed by the TFCI decoding characteristic determination section.

12 Claims, 11 Drawing Sheets

FIG. 6

| Slot Format #i | SF | Bits/Slot | Npilot | Ntpc | Ntfci | Nfbi | Transmitted slots per radio frame |
|---|---|---|---|---|---|---|---|
| 0 | 256 | 10 | 6 | 2 | 2 | 0 | 15 |
| 0A | 256 | 10 | 5 | 2 | 3 | 0 | 10-14 |
| 0B | 256 | 10 | 4 | 2 | 4 | 0 | 8-9 |
| 1 | 256 | 10 | 8 | 2 | 0 | 0 | 8-15 |
| 2 | 256 | 10 | 5 | 2 | 2 | 1 | 15 |
| 2A | 256 | 10 | 4 | 2 | 3 | 1 | 10-14 |
| 2B | 256 | 10 | 3 | 2 | 4 | 1 | 8-9 |
| 3 | 256 | 10 | 7 | 2 | 0 | 1 | 8-15 |
| 4 | 256 | 10 | 6 | 2 | 0 | 2 | 8-15 |
| 5 | 256 | 10 | 5 | 1 | 2 | 2 | 15 |
| 5A | 256 | 10 | 4 | 1 | 3 | 2 | 10-14 |
| 5B | 256 | 10 | 3 | 1 | 4 | 2 | 8-9 |

CORRELATION VALUE AFTER HADAMARD TRANSFORM

INPUT BEFORE HADAMARD TRANSFORM

REFERENCE VALUE INPUT LEVEL 32, NOISE LEVEL ±4

CORRELATION VALUE AFTER HADAMARD TRANSFORM

INPUT BEFORE HADAMARD TRANSFORM

REFERENCE VALUE INPUT LEVEL 32, NOISE LEVEL ±32

CORRELATION VALUE AFTER HADAMARD TRANSFORM

INPUT BEFORE HADAMARD TRANSFORM

REFERENCE VALUE INPUT LEVEL 32, NOISE LEVEL ±64

FIG. 11

| NOISE LEVEL ±N | TFCI DECODING CHARACTERISTIC INDICATOR VALUE |
|---|---|
| 4 | 19.9 |
| 8 | 17.2 |
| 16 | 14.2 |
| 32 | 10.8 |
| 48 | 9.1 |
| 64 | 7.6 |
| 80 | 5.9 |
| 96 | 5.1 |

MOBILE COMMUNICATION SYSTEM, RADIO BASE STATION APPARATUS, AND METHOD FOR DETERMINING UPLINK RECEPTION SYNCHRONIZATION

BACKGROUND OF THE INVENTION

1. Field of the Invention

The present invention relates to a mobile communication system, a radio base station apparatus, and a method for determining uplink reception synchronization. More specifically, the invention relates to a method for determining synchronization in uplink reception compressed mode.

2. Description of the Related Art

Radio base station apparatus in accordance with IMT-2000 (International Mobile Telecommunications-2000) standards adopt compressed mode. Compressed mode is set by a higher-layer apparatus to take measurements in handover between different frequencies with other systems, for example, FDD (Frequency Division Duplex), TDD (Time Division Duplex), and GSM (Global System for Mobile communications) (for example, refer to 3GPP TS25.133, 8, "UE Measurements Procedures").

Compressed mode is a function with which a cell of a different frequency can be measured to perform handover between different frequencies. Single-receiver mobile stations should essentially support downlink compressed mode.

Transition to compressed mode is determined by UTRAN (Universal Terrestrial Radio Access Network), which then informs a mobile station of parameters required in compressed mode.

In compressed mode, data is not transmitted during slots called a transmission gap. To prevent quality degradation due to reduced gain during this halt of transmission in terms of BER (Bit Error Rate) and BLER (BLock Error Rate), transmission power is temporarily increased for frames that are in compressed mode.

In compressed mode, this transmission gap may be repeated. Further, by means of a measurement request or other means, the type of compressed mode may be modified, including the number of slots in a transmission gap, the interval between transmission gaps, and the number of repetitions of transmission gaps (for example, refer to "W-CDMA Mobile Communications System, section 3, Wireless System, 3-3, Wireless Access Interface Standards, m. Compressed Mode" (edited by Keiji Tachikawa, Maruzen Co., Ltd., Mar. 15, 2002, p. 140)).

When uplink compressed mode is set in the above described conventional radio base station apparatus, the slot format of the uplink DPCCH (Dedicated Physical Control Channel) in the physical layer varies greatly from frame to frame as shown in FIG. 6. It is then difficult to make stable determination of uplink reception synchronization. Therefore, there is a need for processing to address this situation.

In particular, the radio base station apparatus use known pilot symbols in determination of uplink reception synchronization. Because the slot format of frames compressed due to compressed mode contains a reduced number of pilot symbols, and further because the number of slots being transmitted is compressed, the number of known pilot symbols per frame is significantly reduced.

Also, the known pilot symbols for compressed frames are made different from those for normal frames. Therefore in compressed mode, determination of uplink reception synchronization is difficult and stable determination of uplink reception synchronization tends to fail. When the radio base station apparatus is in an in-sync state, it performs SIR (Signal to Interference power Ratio) closed-loop power control for providing optimal power control. That is, determination of uplink reception synchronization concerns power control and therefore will significantly affect interferences with other users, the communication quality, and so on.

SUMMARY OF THE INVENTION

An object of the present invention is to solve these problems by providing a mobile communication system, a radio base station apparatus, and a method for determining uplink reception synchronization, that are capable of improving accuracy of synchronization detection and making stable determination of reception synchronization without erroneous synchronization determination.

According to the present invention, there is provided a mobile communication system including a radio base station apparatus for determining uplink reception synchronization by using a pilot symbol of DPCCH (Dedicated Physical Control Channel) from a mobile station. This mobile communication system comprises: means for re-encoding a TFCI (Transport Format Combination Indicator) value that has been once decoded and comparing the re-encoded TFCI value with a TFCI symbol received from the mobile station; and determination means for using the number of TFCI error bits resulting from the comparison to determine uplink reception synchronization.

According to the present invention, there is provided a radio base station apparatus for determining uplink reception synchronization by using a pilot symbol of DPCCH (Dedicated Physical Control Channel) from a mobile station. This radio base station apparatus comprises: means for re-encoding a TFCI (Transport Format Combination Indicator) value that has been once decoded and comparing the re-encoded TFCI value with a TFCI symbol received from the mobile station; and determination means for using the number of TFCI error bits resulting from the comparison to determine uplink reception synchronization.

According to the present invention, there is provided a method for determining uplink reception synchronization in a mobile communication system including a radio base station apparatus for determining uplink reception synchronization by using a pilot symbol of DPCCH (Dedicated Physical Control Channel) from a mobile station. In the radio base station apparatus, this method comprises the steps of: re-encoding a TFCI (Transport Format Combination Indicator) value that has been once decoded and comparing there-encoded TFCI value with a TFCI symbol received from the mobile station; and using the number of TFCI error bits resulting from the comparison to determine uplink reception synchronization.

Thus, a mobile communication system according to the present invention relates to a method for determining uplink reception synchronization in compressed mode described in 3GPP (3rd Generation Partnership Project) TS25.215, Measurement for UTRA FDD.

To solve the above described problems, the mobile communication system according to the present invention implements a method for determining uplink reception synchronization by using pilot symbols and TFCI (Transport Format Combination Indicator) symbols of DPCCH (Dedicated Physical Control Channel).

The TFCI symbols are symbols encoded with a Walsh orthogonal code. Therefore, a Walsh code sequence resulting from Hadamard transform for TFCI decoding is used as a reference symbol for determining reception synchronization. Further, an indicator value of a TFCI decoding characteristic obtained by Hadamard transform is computed and used for determining reception synchronization. In this manner, stable synchronization determination can be made even in compressed mode.

This is possible because the TFCI symbols, unlike the pilot symbols, do not vary greatly in the number of symbols per frame even in compressed mode. Thus, the mobile communication system according to the present invention enables stable determination of uplink reception synchronization even when the number of known symbols, i.e., the pilot symbols is reduced in uplink compressed mode.

BRIEF DESCRIPTION OF THE DRAWINGS

FIG. 6 shows a table of configurations of the uplink DPCCH slot format;

FIG. 11 shows noise levels and corresponding TFCI decoding characteristic indicator values.

DETAILED DESCRIPTION OF THE PREFERRED EMBODIMENTS

Figure 1:
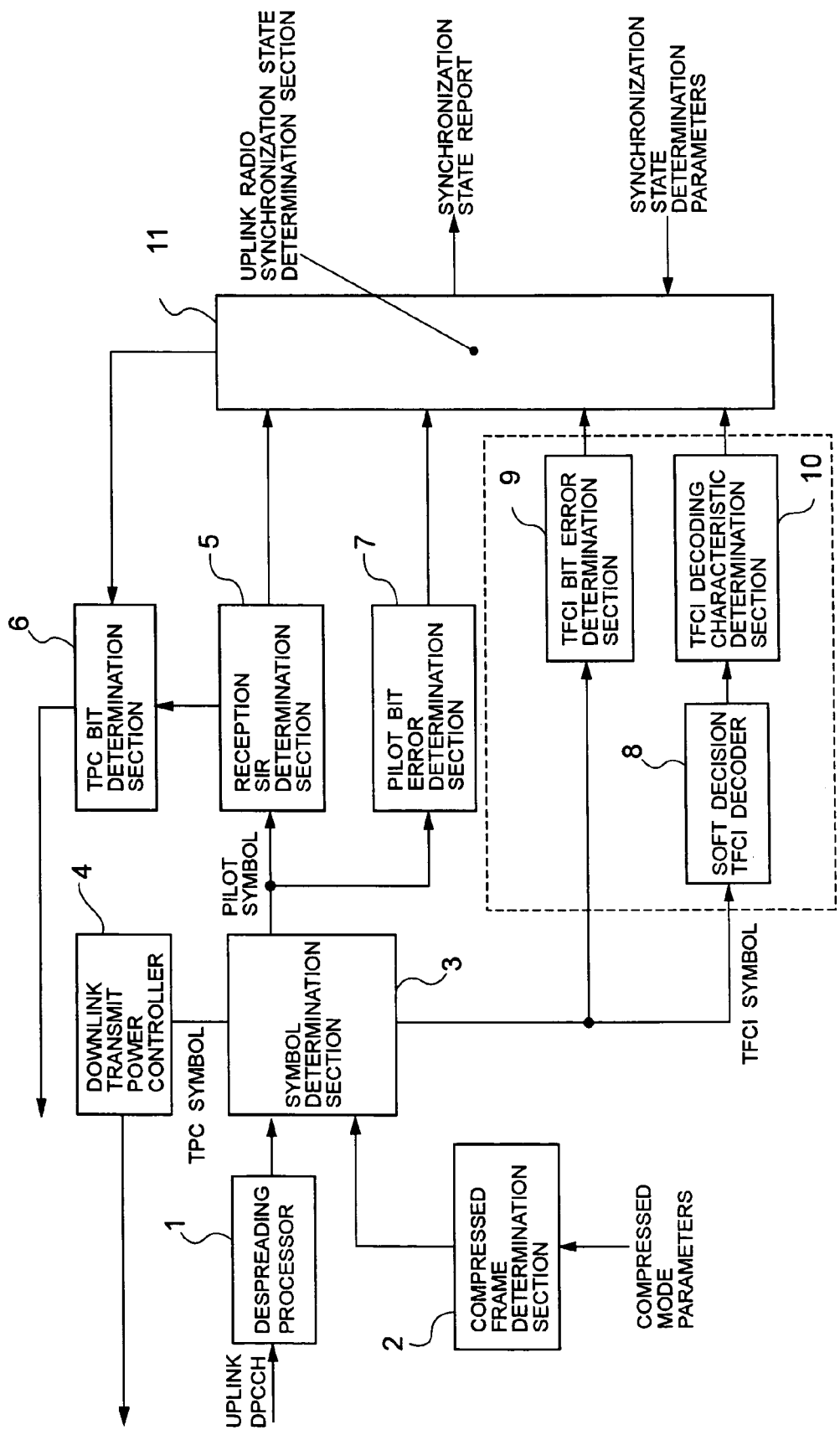
FIG. 1 is a block diagram showing a configuration of a radio base station apparatus according to an embodiment of the invention.

Now, an embodiment of the present invention will be described with reference to the drawings. FIG. 1 is a block diagram showing a configuration of a radio base station apparatus according to the embodiment of the invention. In FIG. 1, the radio base station apparatus according to the embodiment includes a despreading processor 1, a compressed frame determination section 2, a symbol determination section 3, a downlink transmit power controller 4, a reception SIR (Signal to Interference power Ratio) determination section 5, a TPC (Transmit Power Control) bit determination section 6, a pilot bit error determination section 7, a soft decision TFCI (Transport Format Combination Indicator) decoder 8, a TFCI bit error determination section 9, a TFCI decoding characteristic determination section 10, and an uplink radio synchronization state determination section 11.

Figure 5:
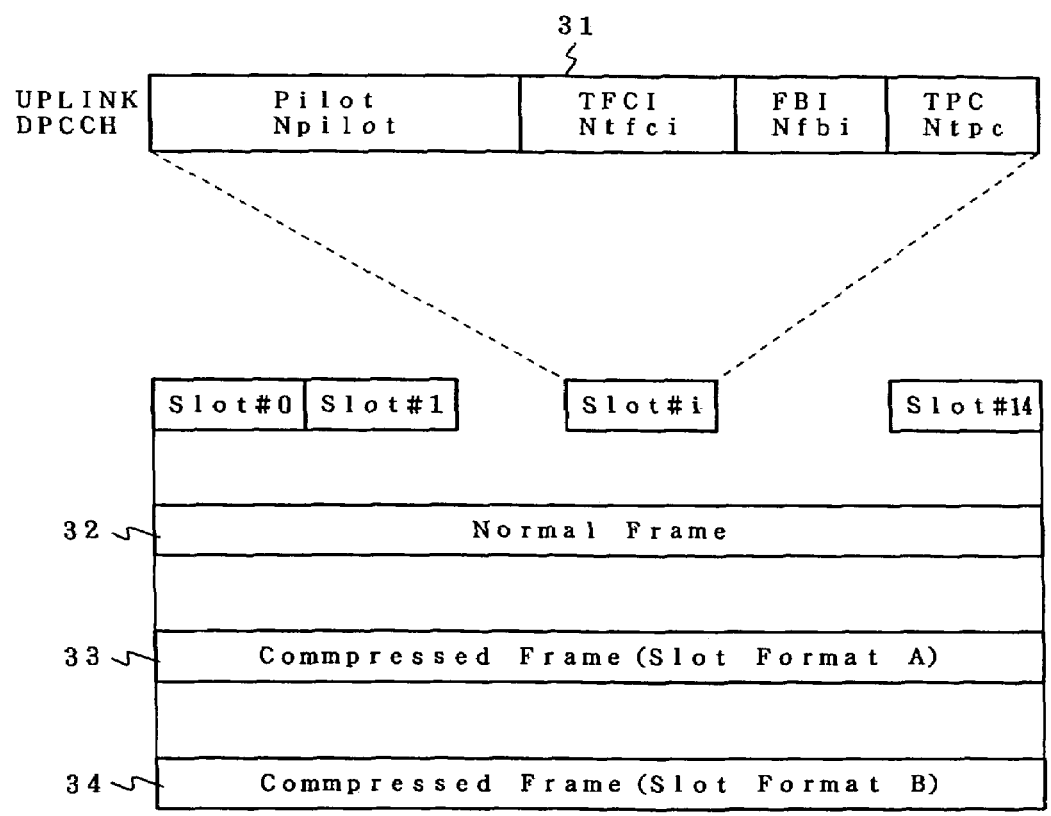
FIG. 5 shows an uplink DPCCH slot format.

FIG. 5 shows an uplink DPCCH (Dedicated Physical Control Channel) slot format. FIG. 6 shows a table of configurations of the uplink DPCCH slot format. Referring to FIGS. 1, 5, and 6, operation of each section will be described.

The despreading processor 1 performs signal processing for despreading a spread-coded uplink DPCCH. The compressed frame determination section 2 determines the state of frames of the physical channel, such as a normal frame 32, a compressed frame (slot format A) 33, and a compressed frame (slot format B) 34 shown in FIG. 5, based on compressed mode parameters informed of by a higher-layer apparatus (not shown).

The symbol determination section 3 separates pilot symbols, TFCI symbols, FBI (Feedback Information) symbols, and TPC (Transmit Power Control) symbols from the uplink DPCCH slot format 31 shown in FIG. 5. The downlink transmit power controller 4 controls downlink transmit power by using TPC bits sent through the uplink DPCCH. The reception SIR determination section 5 computes a reception SIR by using known pilot symbols.

The pilot bit error determination section 7 computes the difference between a hard-decided symbol of a received pilot symbol and a known pilot symbol. The soft decision TFCI decoder 8 computes a TFCI value from a received TFCI code symbol. The TFCI bit error determination section 9 computes the difference between a TFCI symbol re-encoded from the decoded TFCI value and a hard-decided symbol of the received TFCI symbol.

The TFCI decoding characteristic determination section 10 computes a characteristic indicator value from a correlation result of Fast Hadamard Transform used in the soft decision TFCI decoder 8. The uplink radio synchronization state determination section 11 determines state transitions of the uplink synchronization state. This determination is made by using synchronization state determination parameters, the reception SIR value computed by the reception SIR determination section 5, the number of pilot error bits computed by the pilot bit error determination section 7, the number of error TFCI bits computed by the TFCI bit error determination section 9, and the TFCI decoding characteristic indicator value computed by the TFCI decoding characteristic determination section 10.

In this embodiment, the outputs of the TFCI bit error determination section 9 and the TFCI decoding characteristic determination section 10 are input to the uplink radio synchronization state determination section 11. This enables stable determination of uplink synchronization even when the number of pilot symbols is reduced in compressed mode as shown in FIG. 6.

Figure 7:
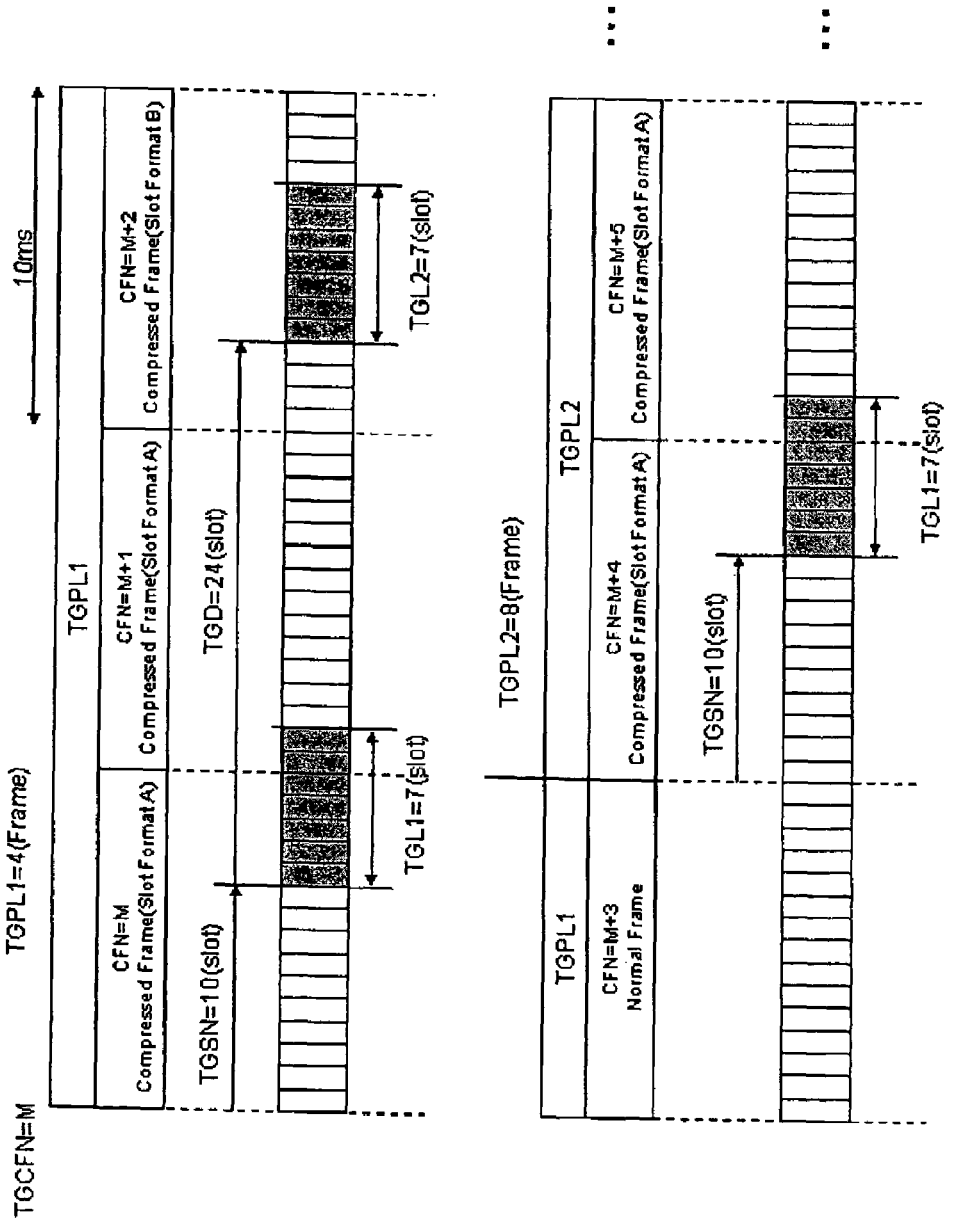
FIG. 7 is a diagram for describing a configuration of uplink compressed frames.

FIG. 7 is a diagram for describing a configuration of uplink compressed frames. Referring to FIGS. 6 and 7, description will be given using specific parameter values as to the change in the frame configuration and decrease in the number of pilot symbols per frame in compressed mode.

The higher-layer apparatus sets the parameters as follows. TGCFN (Transmission Gap Connection Frame Number) is CFN that indicates a physical frame where compressed mode begins. A transmission gap is formed such that it starts from a slot that is offset by the number of slots specified by TGSN (Transmission Gap Starting Slot Number) (slots) from the beginning of the frame specified by TGCFN.

From the slot position that is offset by TGSN (slots), the transmission gap extends with the length of TGL1 (Transmission Gap Pattern Length 1) (slots). The next transmission gap, with the length of TGL2 (Transmission Gap Pattern Length 2), is formed at TGD (Transmission Gap start Distance) (slots) further after TGSN (slots).

TGPL1 (Transmission Gap Pattern Length 1) is a parameter that indicates a pattern of compressed frames formed by the above parameters as a set of frames.

In the present case, the above parameters are set as TGCFN=M (frame), that is 0 to 255, TGSN=10 (slots), TGL1=7 (slots), TGD=24 (slots), TGL2=7 (slots), TGPL1=4 (frames), and TGPL2=8 (frames).

The following description of compressed frames will be given using these specific parameters. As TGCFN=M (frame), TGSN=10 (slots), and TGL1=7 (slots), the transmission gap is formed across the boundary between CFN=M and CFN=M+1.

Because five slots of the transmission gap are included in CFN=M, ten slots are transmitted in this frame. Therefore, the slot format changes to A according to Transmitted Slots per Radio Frame shown in FIG. 6.

For example, if the slot format of normal frames is 2, it changes to 2A. The number of pilot symbols per frame is 5×15=75 for the normal frames, whereas it becomes 4×10=40 for the compressed frames 2A in this case.

Further, because TGD=24 (slots), another transmission gap is formed in frame CFN=M+2, starting at the fifth slot with TGL2=7 (slots). That is, because eight slots are transmitted in this frame, the slot format changes to B and the number of pilot symbols per frame becomes 24. Thus, the number of pilot symbols per frame is reduced in compressed mode.

Figure 2:
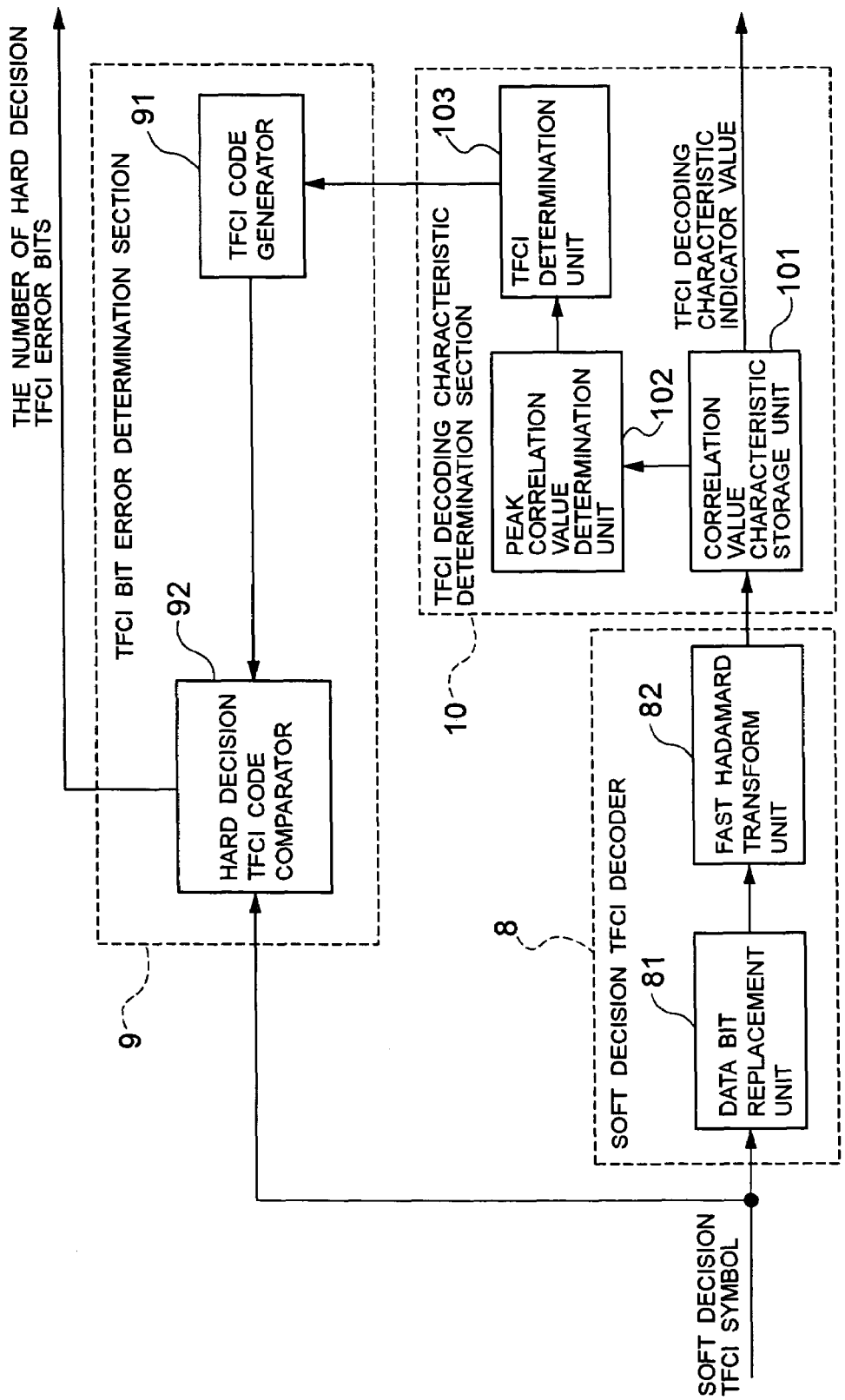
FIG. 2 is a block diagram showing respective configurations of a soft decision TFCI decoder, a TFCI bit error determination section, and a TFCI decoding characteristic determination section in FIG. 1.

FIG. 2 is a block diagram showing respective configurations of the soft decision TFCI decoder 8, the TFCI bit error determination section 9, and the TFCI decoding characteristic determination section 10 in FIG. 1. In FIG. 2, the soft decision TFCI decoder 8 includes a data bit replacement unit 81 and a Fast Hadamard Transform unit 82. The TFCI bit error determination section 9 includes a TFCI code generator 91 and a hard decision TFCI code comparator 92. The TFCI decoding characteristic determination section 10 includes a correlation value characteristic storage unit 101, a peak correlation value determination unit 102, and a TFCI determination unit 103.

Figure 4:
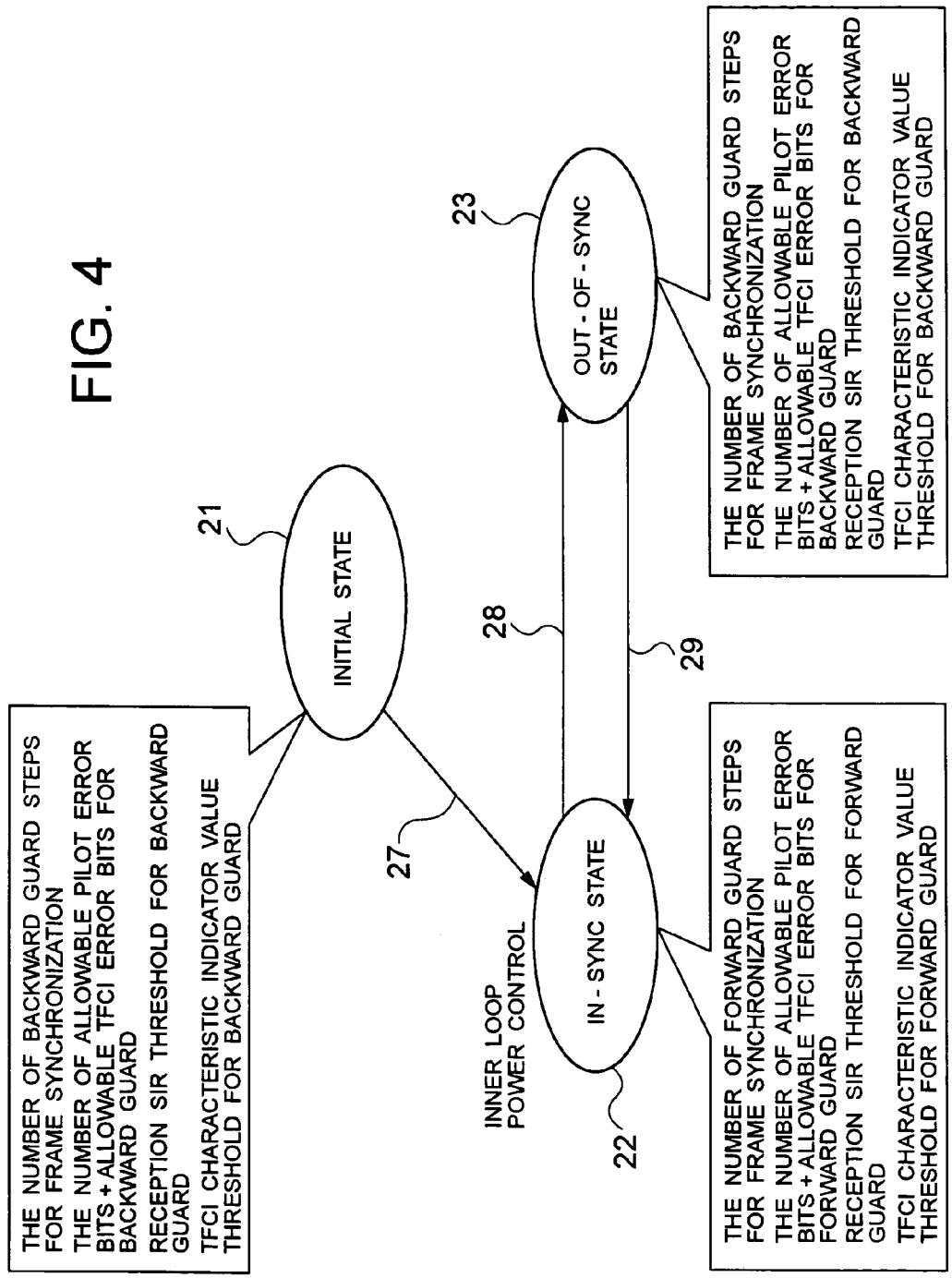
FIG. 4 shows determination of state transitions by the uplink radio synchronization state determination section in FIG. 1.

FIG. 4 shows determination of state transitions by the uplink radio synchronization state determination section 11 in FIG. 1. Referring to FIGS. 1, 2, and 4, operations of the TFCI bit error determination section 9 and the TFCI decoding characteristic determination section 10 will be described. Also, operation of the uplink radio synchronization state determination section 11 will be described, wherein the operation uses the number of hard decision TFCI error bits provided by the TFCI bit error determination section 9 and the TFCI decoding characteristic indicator value provided by the TFCI decoding characteristic determination section 10.

Once the soft decision TFCI symbols separated by the symbol determination section 3 are accumulated for a frame, they are input to the data bit replacement unit 81 of the soft decision TFCI decoder 8. They are converted into Walsh orthogonal sequences by inserting i=30th bit before i=0th bit and inserting i=31th bit before i=15th bit of Basis Sequences for (32, 10) TFCI code found in 3GPP TS 25.212, 4.3.3, Coding of Transport-Format Combination Indicator, Table 8. Thus, soft decision data to be input to the Fast Hadamard Transform unit 82 is inserted.

The Fast Hadamard Transform unit 82 computes correlations to Walsh orthogonal code vectors. The peak correlation value determination unit 102 of the TFCI decoding characteristic determination section 10 determines the Hadamard-transformed index with the most likely correlation. The TFCI determination unit 103 determines a reception TFCI value. This TFCI value is encoded into a TFCI code by the TFCI code generator 91, which is the same as the TFCI code generator residing at a transmitter, and is input to the hard decision TFCI code comparator 92.

The hard decision TFCI code comparator 92 compares the bits of the received soft decision TFCI symbol with the bits of the hard decision TFCI code. As a result, the hard decision TFCI code comparator 92 outputs the number of hard decision TFCI error bits, which is input to the uplink radio synchronization state determination section 11 as information for determining synchronization.

Further, the correlations computed by the Fast Hadamard Transform unit 82 of the soft decision TFCI decoder 8 is stored in the correlation value characteristic storage unit 101 in the TFCI decoding characteristic determination section 10. Then, a TFCI decoding characteristic indicator value is computed and input to the uplink radio synchronization state determination section 11 as information for determining synchronization.

Figure 8A:
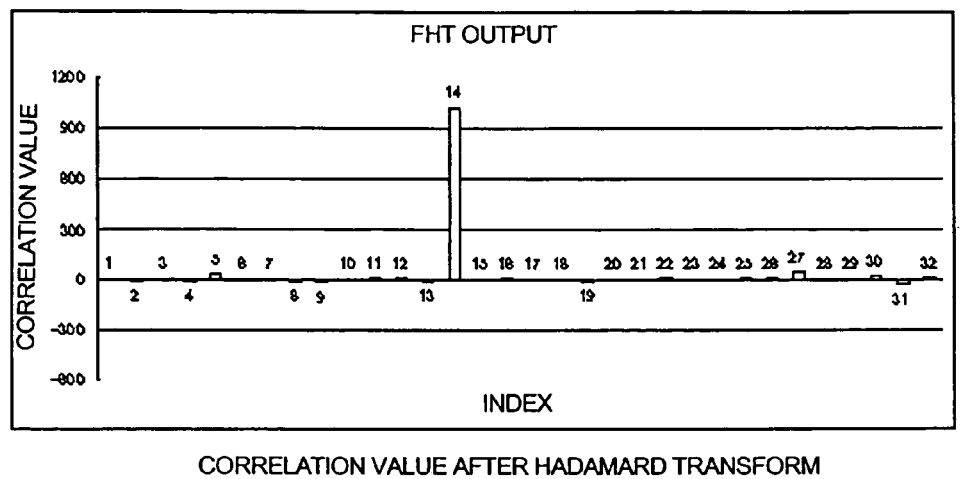
FIGS. 8A and 8B show TFCI encoding characteristics for a reference value input level 32 before Hadamard transform and that after the noise level ±4 has been added.
Figure 8B:
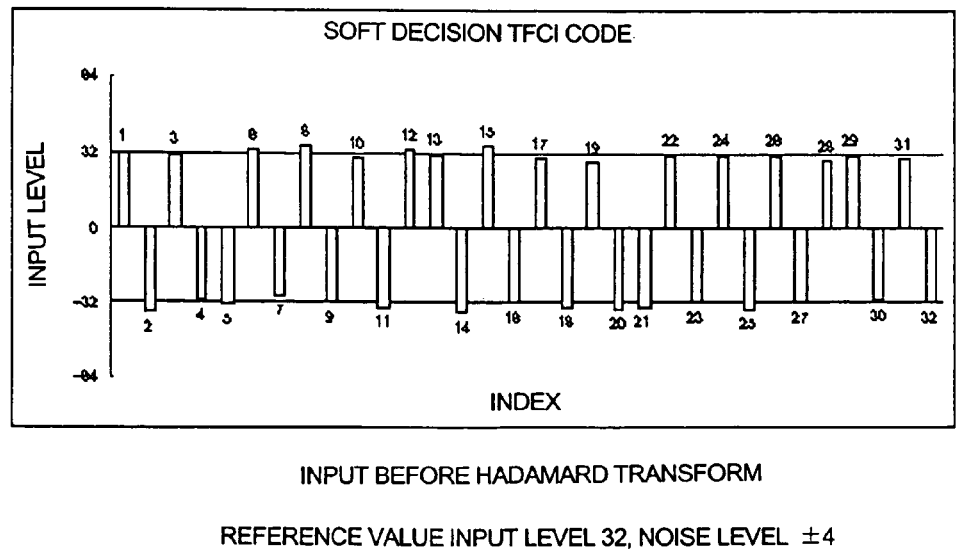
Figure 9A:
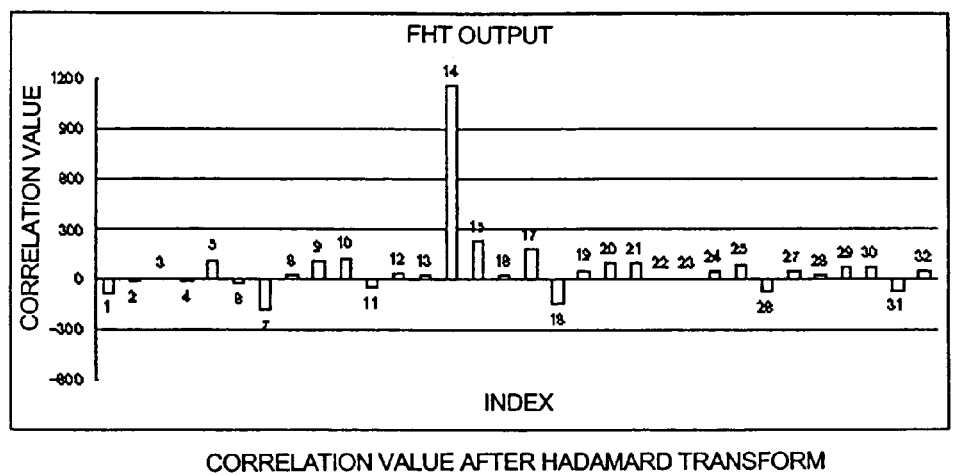
FIGS. 9A and 9B show TFCI encoding characteristics for a reference value input level 32 before Hadamard transform and that after the noise level ±32 has been added.
Figure 9B:
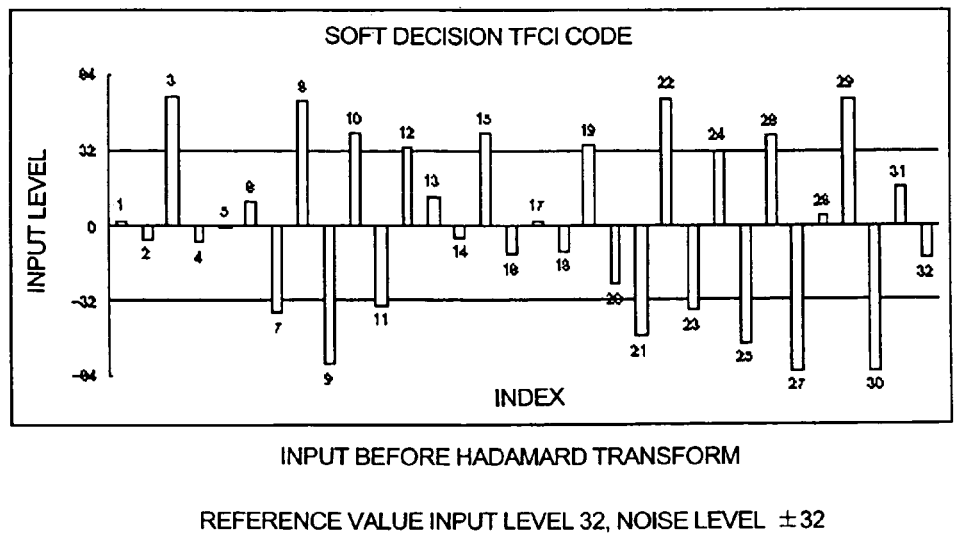
Figure 10A:
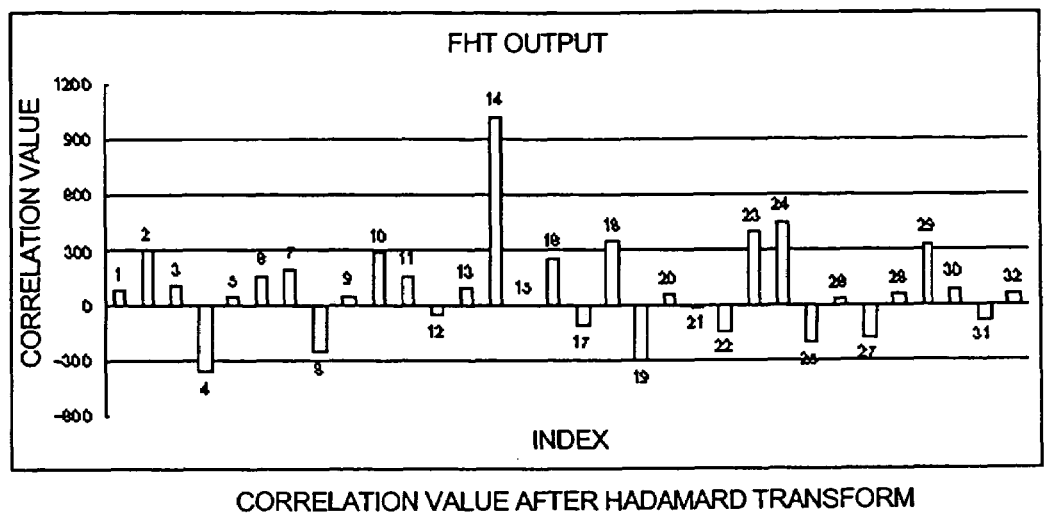
FIGS. 10A and 10B show TFCI encoding characteristics for a reference value input level 32 before Hadamard transform and that after the noise level ±64 has been added.
Figure 10B:
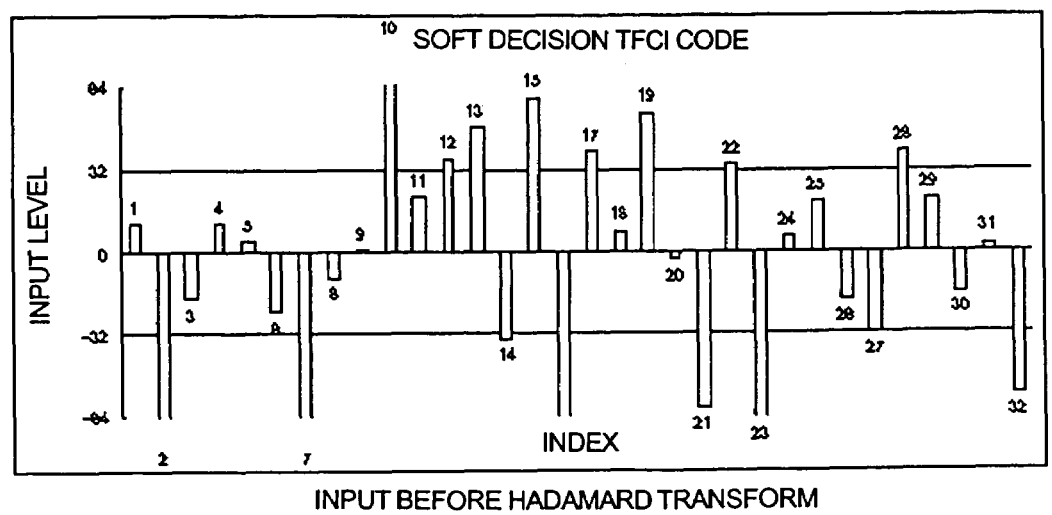

FIGS. 8A and 8B show a TFCI encoding characteristic in the case where the noise level ±4 is added to the reference value input level 32 before Hadamard transform. FIGS. 9A and 9B show a TFCI encoding characteristic in the case where the noise level ±32 is added to the reference value input level 32 before Hadamard transform. FIGS. 10A and 10B show a TFCI encoding characteristic in the case where the noise level ±64 is added to the reference value input level 32 before Hadamard transform. FIG. 11 shows noise levels and corresponding TFCI decoding characteristic indicator values. With reference to FIGS. 8 to 11, how to numerically compute the TFCI decoding characteristic indicator value will be described.

FIGS. 8A, 9A, and 10A show correlation value outputs after Hadamard transform, where the respective noise levels ±N (N=4, 32, 64) are added to the input reference level 32 to be Hadamard-transformed. Here, the noise level is a random value in the range of ±N.

With reference to FIGS. 8A, 9A, and 10A, it can be seen that as the noise level N increases, the correlation values after Hadamard transform to other indices (other Walsh orthogonal vectors) increase. A method for determining the TFCI decoding characteristic indicator value A will be described below.

Let B be the sum total of absolute values of correlation values after Hadamard transform, and C be the peak value of the absolute values of the correlation values after Hadamard transform. The average D of noise components is given by <average $D$ of noise components>=(<sum total $B$ of absolute values of correlation values>−<peak value $C$ of absolute values of correlation values>)/32. (1)

The characteristic indicator value A can be defined as a relative value between the peak value C of the absolute values and the average D of the noise components, which is computed by <characteristic indicator value $A$>=10×log (<peak value $C$ of absolute values of correlation values>/<average $D$ of noise components>). (2)

This computation results at the noise levels ±N (N=4, 8, 16, 32, 48, 64, 80, 96) for the input reference level 32 are shown in FIG. 11.

Figure 3:
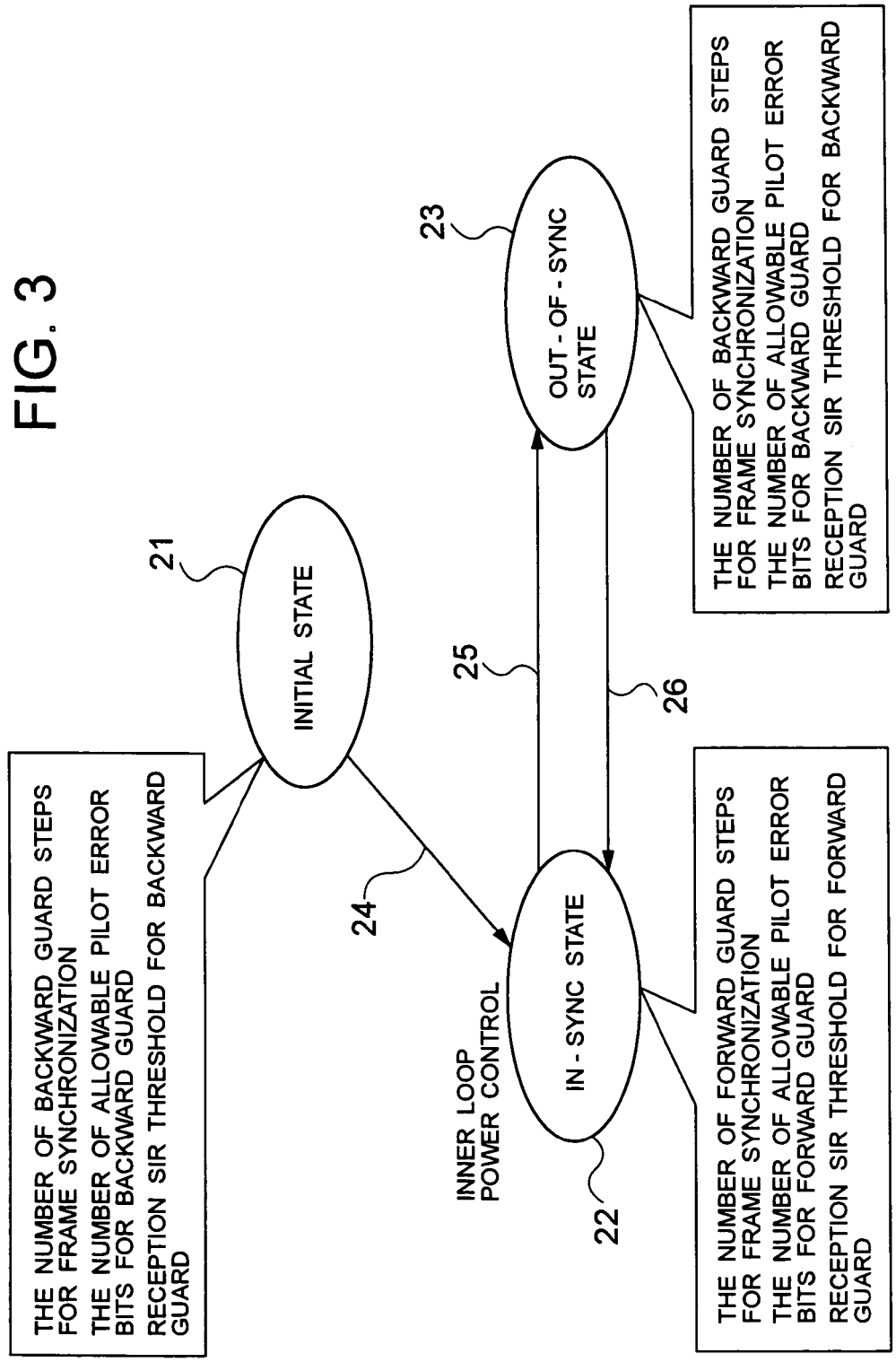
FIG. 3 shows determination of state transitions by an uplink radio synchronization state determination section in FIG. 1, where only pilot symbols are used.

FIG. 3 shows determination of state transitions by the uplink radio synchronization state determination section 11 in FIG. 1, where only pilot symbols are used. Just after a call is set up, the radio base station apparatus is in an initial state 21.

At this point, the transition from the initial state 21 to an in-sync state 22 requires two conditions 24. A first condition is that the number of pilot error bits computed by the pilot bit error determination section 7 is smaller than the number of allowable pilot error bits for backward guard continuously as many times as the number of backward guard steps for frame synchronization. A second condition is that the reception SIR computed by the reception SIR determination section 5 is higher than a reception SIR threshold for backward guard continuously as many times as the number of backward guard steps for frame synchronization. The number of backward guard steps for the number of allowable pilot error bits and the reception SIR threshold is maintained such that it can be controlled as a separate parameter.

The transition from the in-sync state 22 to an out-of-sync state 23 requires two conditions 25. A first condition is that the number of pilot error bits computed by the pilot bit error determination section 7 is greater than the number of allowable pilot error bits for forward guard continuously as many times as the number of forward guard steps for frame synchronization. A second condition is that the reception SIR computed by the reception SIR determination section 5 is lower than a reception SIR threshold for forward guard continuously as many times as the number of forward guard steps for frame synchronization. The number of forward guard steps for the number of allowable pilot error bits and the reception SIR threshold is maintained such that it can be controlled as a separate parameter.

Conditions 26 for the transition from the out-of-sync state 23 to the in-sync state 22 are the same as in the case of the transition from the initial state 21 to the in-sync state 22 described above.

FIG. 4 shows determination of state transitions by the uplink radio synchronization state determination section 11, where pilot symbols and TFCI symbols are used. Two parameters are added to conditions 27 for the transition from the initial state 21 to the in-sync state 22. A first parameter is the number of allowable pilot error bits +allowable TFCI error bits for backward guard. A second parameter is a TFCI characteristic indicator value threshold for backward guard. These information items are input from the TFCI bit error determination section 9 and the TFCI decoding characteristic determination section 10.

Similarly, two parameters are added to conditions 28 for the transition from the in-sync state 22 to the out-of-sync state 23. A first parameter is the number of allowable pilot error bits+allowable TFCI error bits for forward guard. A second parameter is a TFCI characteristic indicator value threshold for forward guard. These information items are input from the TFCI bit error determination section 9 and the TFCI decoding characteristic determination section 10.

Thus, because TFCI symbols are symbols encoded with a Walsh orthogonal code, this embodiment uses a Walsh code sequence resulting from Hadamard transform for TFCI decoding as a reference symbol for determining reception synchronization.

Therefore, in this embodiment, the TFCI symbols are also used to determine uplink reception synchronization. Although the number of known pilot symbols varies for each frame in uplink compressed mode, the accuracy of synchronization detection can be improved, compared to conventional reception synchronization determination techniques. This enables stable determination of reception synchronization without erroneous synchronization determination.

In addition, in the conventional reception synchronization determination techniques, which use only known pilot symbols, the reception SIR value may be erroneously estimated due to the decrease in the number of pilot symbols. However, in this embodiment, the radio characteristic is determined by using the TFCI symbols that do not greatly vary in the number of symbols per frame even in compressed frames and that have been encoded with a Walsh orthogonal code.

Therefore, in this embodiment, the characteristic after Hadamard transform obtained in decoding the TFCI can be used to further improve the accuracy of synchronization detection, compared to the conventional reception synchronization determination techniques. This also enables stable determination of reception synchronization.

Moreover, because this embodiment enables determination of reception synchronization with an improved accuracy, optimal closed-loop transmit power control can be provided even in compressed mode. This can minimize interferences with other users.

Although this embodiment is highly effective in uplink compressed mode as described above, it is also applicable when the mode is not set to the uplink compressed mode.

It is also possible in this embodiment to provide the uplink radio synchronization state determination section 11 with control means for determining whether or not to use the input information from the reception SIR determination section 5, the pilot bit error determination section 7, the TFCI bit error determination section 9, and the TFCI decoding characteristic determination section 10, depending on the state of the radio environment.

What is claimed is:

1. A mobile communication system including a radio base station apparatus for determining uplink reception synchronization by using a pilot symbol of DPCCH (Dedicated Physical Control Channel) from a mobile station, the system comprising:
    means for re-encoding a TFCI (Transport Format Combination Indicator) value that has been once decoded and comparing the re-encoded TFCI value with a TFCI symbol received from the mobile station; and
    determination means for using the number of TFCI error bits resulting from the comparison to determine uplink reception synchronization.

2. The mobile communication system according to claim 1 further comprising means for computing a characteristic indicator value from a decoding characteristic resulting from Hadamard transform used in decoding the TFCI value,
    wherein the characteristic indicator value is used to determine uplink reception synchronization.

3. The mobile communication system according to claim 2 further comprising control means for determining whether or not to use a reception SIR (Signal to Interference power Ratio) value computed with the pilot symbol, the number of pilot error bits of the pilot symbol, the number of the TECI error bits, and the characteristic indicator value for the determination of uplink reception synchronization, depending on a radio environment.

4. A radio base station apparatus for determining uplink reception synchronization by using a pilot symbol of DPCCH (Dedicated Physical Control Channel) from a mobile station, the apparatus comprising:
    means for re-encoding a TFCI (Transport Format Combination Indicator) value that has been once decoded and comparing the re-encoded TFCI value with a TFCI symbol received from the mobile station; and determination means for using the number of TFCI error bits resulting from the comparison to determine uplink reception synchronization.

5. The radio base station apparatus according to claim 4 further comprising means for computing a characteristic indicator value from a decoding characteristic resulting from Hadamard transform used in decoding the TFCI value, wherein the characteristic indicator value is used to determine uplink reception synchronization.

6. The radio base station apparatus according to claim 5 further comprising control means for determining whether or not to use a reception SIR (Signal to Interference power Ratio) value computed with the pilot symbol, the number of pilot error bits of the pilot symbol, the number of the TFCI error bits, and the characteristic indicator value for the determination of uplink reception synchronization, depending on a radio environment.

7. A method for determining uplink reception synchronization in a mobile communication system including a radio base station apparatus for determining uplink reception synchronization by using a pilot symbol of DPCCH (Dedicated Physical Control Channel) from a mobile station, the method comprising the steps, in the radio base station apparatus, of:

re-encoding a TFCI (Transport Format Combination Indicator) value that has been once decoded and comparing the re-encoded TECI value with a TFCI symbol received from the mobile station; and using the number of TFCI error bits resulting from the comparison to determine uplink reception synchronization.

8. The method for determining uplink reception synchronization according to claim 7, further comprising the step of computing a characteristic indicator value from a decoding characteristic resulting from Hadamard transform used in decoding the TFCI value, wherein the characteristic indicator value is used to determine upliuk reception synchronization.

9. The method for determining uplink reception synchronization according to claim 8, further comprising the step of determining whether or not to use a reception SIR (Signal to Interference power Ratio) value computed with the pilot symbol, the number of pilot error bits of the pilot symbol, the number of the TFCI error bits, and the characteristic indicator value for the determination of uplink reception synchronization, depending on a radio environment.

10. The mobile communication system according to claim 2, wherein said characteristic indicator value is equal to 10×log (C/D), wherein:

C is equal to peak value of absolute values of correlation values obtained from said Hadamard transform, D is the average of noise components and is equal to (B−C)/32, and B is equal to sum total of absolute values of correlation values obtained from said Hadamard transform.

11. The radio base station apparatus according to claim 5, wherein said characteristic indicator value is equal to 10×log (C/D), wherein:

C is equal to peak value of absolute values of correlation values obtained from said Hadamard transform, D is the average of noise components and is equal to (B−C)/32, and B is equal to sum total of absolute values of correlation values obtained from said Hadamard transform.

12. The method for determining uplink reception synchronization according to claim 8, wherein said characteristic indicator value is equal to 10×log (C/D), wherein:

C is equal to peak value of absolute values of correlation values obtained from said Hadamard transform, D is the average of noise components and is equal to (B−C)/32, and B is equal to sum total of absolute values of correlation values obtained from said Hadamard transform.

\* \* \* \* \*

UNITED STATES PATENT AND TRADEMARK OFFICE
CERTIFICATE OF CORRECTION

PATENT NO. : 7,298,731 B2  Page 1 of 1
APPLICATION NO. : 10/721886
DATED : November 20, 2007
INVENTOR(S) : Takahiro Naito It is certified that error appears in the above-identified patent and that said Letters Patent is hereby corrected as shown below:

Column 8, line 58
Delete "TECI" and insert -- TFCI --

Signed and Sealed this

Thirtieth Day of September, 2008

JON W. DUDAS
*Director of the United States Patent and Trademark Office*